United States Patent [19]

Swenson

[11] 4,033,210
[45] July 5, 1977

[54] LIVE CENTER WITH HYDRAULIC PRESSURE INDICATOR

[75] Inventor: Henry F. Swenson, Roseland, N.J.

[73] Assignee: J & S Tool Company, Inc., Livingston, N.J.

[22] Filed: Oct. 15, 1976

[21] Appl. No.: 732,806

[52] U.S. Cl. .................................. 82/31; 82/33 R
[51] Int. Cl.² ........................................ B23B 23/04
[58] Field of Search ........................... 82/31, 33 R

[56] References Cited

UNITED STATES PATENTS

| 1,921,502 | 8/1933 | Brill | 82/31 |
| 3,292,467 | 12/1966 | Heer | 82/31 |
| 3,943,803 | 3/1976 | Hafla | 82/31 |

FOREIGN PATENTS OR APPLICATIONS

| 1,332,414 | 10/1973 | United Kingdom | 82/31 |

Primary Examiner—Leonidas Vlachos
Attorney, Agent, or Firm—Ralph R. Roberts

[57] ABSTRACT

This invention discloses a heavy-duty live center for a heavy workpiece usually of 10 or more tons. This center includes an outer quill or housing which is movable in a tailstock housing of a lathe or grinder. This live center incorporates the self-aligning front bearing arrangement shown in U.S. Patent application Ser. No. 643,909, filed Dec. 23, 1975. As described in that application this heavy-duty center has the center spindle bowed by the load and as the thrust increases because of heat, etc. there is a Belleville-type spring arrangement which accommodates the increased thrust. The outer housing or quill in the present invention receives the thrust of the load. The quill is moved into a workpiece supporting condition by the action of a screw on an enclosed nut in the rear of the quill. The thrust is measured by a hydraulic load cell and connected hydraulic pressure gage. This gage is carried on the forward exterior part of the housing. The hydraulic pressure is derived from the thrust on a closed circular hydraulic ring portion that measures the total thrust on the center. Belleville-type springs in combination with the hydraulic pressure cell accommodate the increase in thrust which occurs because of heating the workpiece during processing.

10 Claims, 3 Drawing Figures

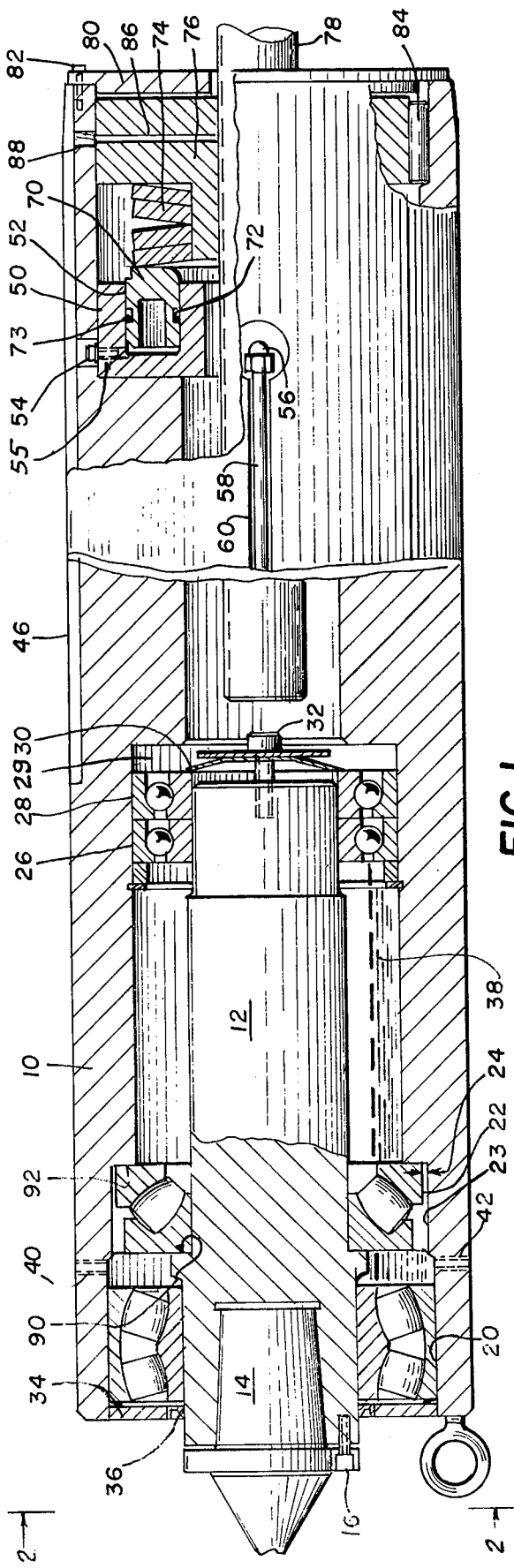
FIG.1
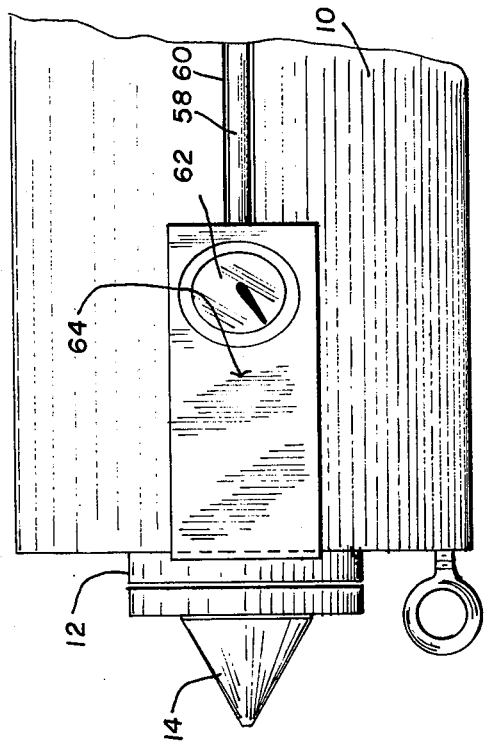
FIG.3
FIG.2

LIVE CENTER WITH HYDRAULIC PRESSURE INDICATOR

CROSS REFERENCE TO RELATED APPLICATION

The present invention relates to heavy-duty live centers such as is shown in my U.S. Patent Application Ser. No. 643,909, filed Dec. 23, 1975 and entitled, "Heavy-Duty Live Centers".

BACKGROUND OF THE INVENTION

1. Field of the Invention

With reference to the classification of art as established in the U.S. Patent and Trademark Office the present invention is believed to be found in the general Class entitled, "Turning" (Class 82) and more particularly in the subclass entitled, "Lathe-Centers" (subclass 33R).

2. Description of the Prior Art

Live centers are well known and in particular the use of hydraulic gages to indicate the thrust or load on the rotating center members is known and is shown in the prior art. In particular, reference is made to U.S. Pat. No. 2,844,063 as issued to ROHM on July 22, 1958. In this patent is shown a hydraulic gage which is carried by the housing and which is actuated by the longitudinal motion of the rotating spindle as it is moved rearwardly by the developed thrust of and by the workpiece. In the live center of the ROHM patent and in others known to the Applicant there has been no attempt to accept a full thrust on a heavy-duty live center disposed to carry a heavy workpiece. After a workpiece has been mounted in a live center and the work member is subject to the process of finishing it often becomes heated to cause a further thrust load upon the live center.

In particular, the live center and hydraulic reading as seen in ROHM anticipates and requires that the rotatable center member which is supported by the bearing is movable directly against a hydraulic reservoir. In heavy-duty live centers such a movement and the bowing of the center spindle as detailed in my above-identified application is not acceptable and/or cannot be tolerated. Accuracy of the live center during all periods of use requires that the revolving center member be fully retained against any longitudinal movement that might result in diviations. In the invention, as depicted, both the rotating center and the quill or housing are carried in the tailstock of the lathe or grinder. The live center as a unit is moved by a screw in the tailstock of the lathe or grinder. This screw actuates or moves a nut which carries a series of Belleville-type washers or springs which have the capacity to accept the anticipated longitudinal thrust or expansion of the workpiece as carried by the live center. A totally or completely closed, hydraulic, circular cell and reservoir are carried in and by this quill or housing and have a protruding portion of the cell resting against and pushed by the Belleville-type springs. These Belleville-type springs accept the increased thrust as is produced by heating of the workpiece. This expansion is accommodated without disturbing and destroying the alignment of the revolving center as carried in the quill and by the thrust and radial bearings. A bowing of the revolving center member which occurs under heavy loads does not affect the hydraulic load cell which is carried in the rear portion of the quill or housing. The bowing of the rotating center portion of the heavy-duty live center is accommodated in the present heavy-duty live center.

SUMMARY OF THE INVENTION

This invention may be summarized at least in part with reference to its objects.

It is an object of this invention to provide a heavy-duty live center whose rotating center member is carried in a quill or housing by and with bearings adapted to support the heavy load on this rotating member and to accommodate the thrust and bowing while supporting the workpiece. The longitudinal thrust forces are accommodated by a combination load cell which includes a circular hydraulic closed reservoir and a series of Belleville-type springs which are carried in the quill and are brought into actuation by a screw in the tailstock as it engages a nut in the quill.

It is a further object of this invention to provide, and it does provide, a heavy-duty live center in which the rotating center is carried by a quill and the thrust from the workpiece is accommodated and read by a hydraulic load cell carried in the rear of the quill. This load cell is actuated independently of any motion of the rotating center in the quill.

In brief, the heavy-duty live center of this invention includes the concept and general construction as shown in my U.S. patent application Ser. No. 643,909, filed Dec. 23, 1975. In addition to the providing for the bowing of the rotating center member while maintaining the required accuracy, there is additionally provided a load cell in the rear of the quill or housing. This load cell includes a hydraulic reservoir of closed circular configuration. From this reservoir a closed, hydraulic line leads to a gage which reads the pressure in the hydraulic cell. Belleville-type springs carried by a nut member which is mated with and moved by a screw in the tailstock moves the quill into the desired supporting condition. The Belleville-type springs permit longitudinal movement of the live center in response to an increase of the thrust which occurs because of heat build up during processing. This increase of thrust is represented by an increase in hydraulic pressure.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen a specific embodiment of the heavy-duty live center with a hydraulic gage for reading the developed thrust as adopted for use on lathes and grinders and showing a preferred means for mounting in the tailstock portions thereof. This specific embodiment has been chosen for the purposes of illustration and description as shown in the accompanying drawings wherein:

BRIEF DESCRIPTION OF THE DRAWINGS

FIG. 1 represents a sectional side view, partly diagrammatic and showing the construction and relationship of the several components making up the heavy-duty live center and the hydraulic gage for indicating the thrust on this live center;

FIG. 2 represents a front view taken on the line 2—2 of FIG. 1 and looking in the direction of the arrows and partly in section and showing a mounting of the hydraulic gage upon the foreportion of the center, and FIG. 3 represents a fragmentary side view and showing the arrangement of the hydraulic gage as it is carried on and by the heavy-duty live center.

In the following description and in the claims various details are identified by specific names for convenience, these names, however, are intended to be generic in their application. Corresponding reference characters refer to like members throughout the three figures of the drawing.

This drawing and this specification disclose certain details of construction for the purpose of explanation but it should be understood that structural details may be modified in various respects and that the invention may be incorporated in other structural forms than shown.

DESCRIPTION OF THE PREFERRED EMBODIMENT

Referring now to FIGS. 1, 2 and 3, there is depicted a live center substantially as shown in the referenced application Ser. No. 643,909, filed Dec. 23, 1975. To the extent applicable application Ser. No. 643,909 is incorporated by reference into this application. As shown, the live center in this reference and as incorporated in the present embodiment includes an outer quill or housing 10 in which is carried a revolving center 12. If desired, this revolving center member may have a removable forward portion 14 secured in place by screws 16. The removable center 14 and the socket-head cap screw 16 are merely a matter of selection and the center 12 may be furnished as a single member. This revolving member 12, as depicted, is carried on its foreportion by means of a self-aligning radial bearing 20 and a self-aligning thrust bearing 22. Bearing 22 is permitted and is contemplated as being displaced a determined amount from the theoretical center line of the center by the bowing of the center member as described in the reference application. This movement is limited by the enlargement of bore 23 in relation to the outer diameter of bearing 22. This amount of displacement is indicated by dimension 24. The purpose and degree of displacement is more fully discussed in the above-identified application. Ball bearings 26 and 28 are carried on their outer races in a bore 29 in quill 10 and support the rear end of the rotating center 12. These bearings are retained on their inner diameter by means of a Belleville-type spring 30 and screw 32, as more fully described in the above-identified application. The center 12 at its intermediate portion is allowed to move or bend in a bowed condition to the extend developed by the heavy-duty work load on the center member. Bearing 22 moves in the enlarged bore 23 to its upward position, as seen in FIG. 1 and as described in the above-identified patent application. The forward bore in the quill 10 is closed by a spacer 34 and a grease seal 36 which seal rides upon the outer diameter of the spindle 12. This seal prevents entry of chips, dirt, coolant and the like and a loss of oil carried within the live center. It has been found advantageous to provide a lubricant 38 for the bearings 20, 22, 26 and 28 and in the present embodiment and for this purpose there has been provided an oil entry hole 40 and an oil drain hole 42 located diametrically opposite. This oil 38 may be drained from hole 42. An oil level checking hole 44 is positioned approximately thirty degrees above the bottom of the bore or hole 42 and provides a level of oil which is sufficient to lubricate the bearings 20, 22, 26 and 28. A keyway 46 which mates with a corresponding key in the tailstock, not shown, insures that the quill 10 is maintained in the desired orientation during used and mounting.

At and in the rear end of the quill or housing 10 is provided a hydraulic load cell which in the present instance includes a channel ring 50 in which is formed a recess 52. This ring is retained in place by pins or screws, not shown. A filler screw 54 after positioning of the ring is mounted in the quill and closes a passageway 55 in bore 52. A conductor or passageway 56 has a connection to a longitudinal tube or pipe 58 which is carried in the groove 60 formed in the outer surface of quill 10. This tube 58 is connected at its forward end to a hydraulic pressure gage 62 which is carried on a bracket 64. This bracket is removably secured at its forward end to a front shoulder or face of the quill 10 by means of socket-headed screws 66. The pressure gage can also be mounted flush with the outer surface of the quill 10 when wall thickness is sufficient. In the recess 52 is carried a hydraulic piston 70 which is sealed by means of 0-rings 72 and 73. Belleville-type springs 74 are carried by a nut or actuated thrust member 76 having threads which engage and are in mesh with screw 78 which is a part of the tailstock portion of the lathe and/or grinder. As the screw is turned, the live center is moved forwardly and backwardly. The rear end of the quill is closed by a shoulder disc or retainer plate 80 and retained by means of screws 82 to the quill 10. One or more dutchman pins 84 retain the screw member 76 in a desired orientation and prevent it from being rotated with the quill. A grease access passageway 86 for admitting and supplying heavy lubricant to the threads is closed by a plug or other device 88 to prevent dirt and the like from entering into threads of the screw 78 and the nut 76.

The live center above-described that the rotating member 12 is carried in bearings so that a self-aligning action is maintained. This center member 12 is not movable longitudinally at least to an extent needed to measure hydraulically the developed end thrust. Bearing 22 is specifically arranged to accept this thrust load of the workpiece as it is heated by processing. This thrust is transferred to the non-rotating outer quill 10. The hydraulic load cell assembly provided at and in the quill reads this thrust load force as it is developed and translates this thrust into a force readable on the gage 62. The Belleville-type springs 86 provide for the desired expansion of the workpiece as it is heated during its processing and this increase in the thrust is readable on the gage as the springs are flattened by the increase in thrust. The revolving center member 12 is not moved longitudinally in the quill 10 during this expansion hence no loss in accuracy in the support of the workpiece occurs because of the increase in length of the workpiece and the increase of thrust.

The front spacer 34 may be secured in place by threads or otherwise positioned. Shoulder 90 on the spindle 12 engages the inner race of bearing 22. Face 92 at the end of bore 23 provides the shoulder stop for the outer race of bearing 22. The nut 76 is retained rotationally by the dutchman 84 but longitudinal movement of the nut in the quill is permitted by this keying method. Groove 46 is made sufficient to mate with a key or pin carried in the tailstock of the machine tool. Groove 60 is made sufficiently deep to retain tubing 58 while the quill is mounted and moved in the tailstock.

Terms such as "left", "right", "up", "down", "bottom", "top", "front", "back", "in", "out" and the like are applicable to the embodiment shown and described in conjunction with the drawing. These terms are merely for the purpose of description and do not necessarily apply to the position in which a heavy-duty live center with thrust load reading gage may be constructed or used.

While a particular embodiment of the live center and hydraulic load cell has been shown and described the invention is not limited thereto since modifications may be made within the scope of the accompanying claims and protection is sought to the broadest extent the prior art allows.

What is claimed is:

1. A heavy-duty live center for lathes, grinders and like machine tools in which the work load is in excess of 10 tons and includes visual means for indicating the thrust on the live center, said center including: (a) a hollow quill; (b) a rotatable spindle carried in this quill, the quill in mounted condition having a work load supporting and extending beyond the quill and with the intermediate portion of the spindle sized so as to provide sufficient clearance between the bore and spindle for the spindle to bow withe the application of a heavy load and when bowed the spindle turns freely in the quill; (c) a self-aligning roller bearing mounted on the foreportion of the spindle and adjacent thereto and to the rear thereof is a self-aligning spherical roller thrust bearing; (d) a front bore formed in this quill, the front portion of this bore precisely sized to receive and retain the outer race of the self-aligning roller bearing and the rear portion of this front bore is made a determined amount oversized in its diameter with regard to the diameter of the outer race of the thrust bearing, the rear of this front bore having a face surface normal to the axis of the bore, this face surface providing a stop surface for the rear face of the outer race of the thrust bearing, this thrust on the bearing being transferred to this face and thence to the quill; (e) antifriction bearing means mounted on the rear of the rotating spindle and when mounted in the bore of the quill adapted to receive and support the rear of the spindle; (f) a biasing means in association with the spindle and said bearing means on the rear of the spindle and adapted to provide a preload to the bearings carried in the front bore of the quill, (g) a shoulder provided on the fore-portion of the spindle, this shoulder adapted to engage the inner race of the self-aligning bearing and as urged by the applied preload to this spindle the bearing is drawn rearwardly and as this bearing is moved rearwardly its inner race moves the inner race of the self-aligning spherical roller thrust bearing rearwardly to cause the outer race of said thrust bearing to be brought into sliding engagement with the inner rear face surface of the front bore; (h) sealing means in association with the spindle and front bore of the quill to close the front bore to dirt, coolant and the like to retain a lubricant in the bearings without contamination and when a heavy load is placed on the extending end of the spindle, the spindle is bowed in accordance with the load and the stiffness of the spindle, the self-aligning bearing moving into alignment with the bowing of the spindle and the outer race of the thrust bearing is moved in the enlarged bore an amount equal to the bowing of the spindle at the inner race of the thrust bearing; (i) a hydraulic load cell carried by and in the rear portion of the quill and including a recess ring portion and a piston portion carried by and in this recess in a fluid tight manner, one member portion carried in a fixed condition by and in the quill and the other movable member slidably carried by the fixed member; (j) a nut-like member slidably carried in the quill and adapted to mate with and engage a threaded screw as carried by a tailstock of the machine tool; (k) a heavy-duty spring-like overtravel member carried by the nut-like member and interposed between this spring and the slidable mating member of the hydraulic load cell, and (l) a hydraulic conductor leading from the hydraulic load cell to and connected to a hydraulic gage secured to the quill, the hydraulic gage indicating the pressure in the load cell as the work load is mounted and expands under working conditions, the spring-like overtravel member providing the needed bias to limit the movement of the quill under the increased thrust to a determined limit of travel.

2. A live center according to claim 1 in which the hydraulic gage is carried on a bracket secured to the quill.

3. A live center according to claim 1 in which the sealing means for the rotating spindle is a grease seal.

4. A live center according to claim 1 in which the fixed member of the hydraulic load cell is the ring-like member with the ring-like recess formed therein and the piston is a ring-like member having seals thereon and having a portion which extends so as to be engaged by the overtravel spring-like member.

5. A live center according to claim 1 in which the nut-like member is longitudinally slidably retained in and by the quill and is prevented from turning by a key-like member engaging both the quill and nut-like member.

6. A live center according to claim 1 in which there is provided a lubricant fill access hole and selectable closure member and a separate lubricant drain hole and selectable closure and a lubricant level determining access hole and closure, these holes enabling lubricant to be supplied to the bearings, to be drained from the interior and to be checked as to the presence of a desired and maintained level of lubricant, 7. A live center according to claim 1 in which there is provided with the hydraulic load cell a hydraulic fill hole and a removable pressure seal for this fill hole, this fill hole leading and connecting to the ring-like recess and additionally there is a hydraulically closed tubing means leading from this recess to the hydraulic gage.

8. A live center according to claim 1 in which the threads in the nut-like member and the mating threads of the threaded screw is supplied with heavy lubricant through a selectively closed passageway leading from the exterior of the quill to be threaded portion of the nut-like member.

9. A live center according to claim 1 in which the quill is in a desired orientation and from turning by a keyway formed longitudinally in the outer surface of the quill, this keyway sized to slide and mate with a key means provided in and with the tailstock of the machine tool.

10. A live center according to claim 1 in which the hydraulic tubing leading from the load cell to the gage is carried in a groove in the rear portion of the quill, the tubing carried sufficiently below the surface of the quill to enable the live center quill to be mounted in the tailstock of the machine tool without damage to the tubing.

* * * * *